United States Patent
Shartzer et al.

(10) Patent No.: US 10,280,981 B2
(45) Date of Patent: May 7, 2019

(54) SYSTEM AND METHOD FOR MONITORING MOVEMENT OF A ROLLER ELEMENT OF A BEARING

(71) Applicant: General Electric Company, Schenectady, NY (US)

(72) Inventors: Samuel Bryan Shartzer, Greenville, SC (US); Joseph Edward Birkenstock, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/671,222

(22) Filed: Aug. 8, 2017

(65) Prior Publication Data
US 2019/0048937 A1  Feb. 14, 2019

(51) Int. Cl.
*F16C 41/00* (2006.01)
*F16C 19/08* (2006.01)
*F16C 33/58* (2006.01)

(52) U.S. Cl.
CPC ............ *F16C 41/007* (2013.01); *F16C 19/08* (2013.01); *F16C 33/585* (2013.01); *F16C 2360/31* (2013.01)

(58) Field of Classification Search
CPC ...... F16C 19/52; F16C 33/583; F16C 33/585; F16C 33/586; F16C 41/007; F16C 43/06; F16C 2360/31
USPC ........................................................ 384/507
See application file for complete search history.

(56) References Cited

U.S. PATENT DOCUMENTS

| | | | |
|---|---|---|---|
| 7,245,123 B2 | 7/2007 | Inoue et al. | |
| 7,825,653 B2 | 11/2010 | Ueno et al. | |
| 7,843,192 B2 | 11/2010 | Galeote | |
| 8,467,045 B2 | 6/2013 | Arciuli | |
| 2006/0182634 A1* | 8/2006 | Kirsch | F16C 33/58 416/244 A |

(Continued)

FOREIGN PATENT DOCUMENTS

| | | | |
|---|---|---|---|
| DE | 199 37 203 A1 | 3/2000 | |
| DE | 102012200781 A1 * | 7/2013 | F16C 19/52 |

(Continued)

OTHER PUBLICATIONS

Extended European Search Report and Opinion issued in connection with corresponding EP Application No. 18187912.3 dated Jan. 15, 2019.

*Primary Examiner* — Phillip A Johnson
(74) *Attorney, Agent, or Firm* — Dority & Manning, P.A.

(57) ABSTRACT

A bearing assembly for a wind turbine includes a bearing having an outer race, an inner race rotatable relative to the outer race, and a plurality of roller elements positioned within at least one raceway defined between the outer and inner races. Further, the bearing assembly includes at least one position sensor arranged with the at least one raceway. As such, the position sensor(s) is configured for monitoring movement of the plurality of roller elements. Moreover, the bearing assembly includes a controller communicatively coupled to the position sensor(s). Thus, the controller is configured to determine receive an output from the position sensor(s) and determine a position of one or more of the plurality of roller elements based on an output from the position sensor(s).

19 Claims, 11 Drawing Sheets

(56) References Cited

U.S. PATENT DOCUMENTS

2011/0057451 A1* 3/2011 Volmer .................. F03D 80/70
290/55
2011/0182536 A1 7/2011 Matsuda et al.
2016/0169288 A1* 6/2016 Leimann ............... F16C 41/007
384/448

FOREIGN PATENT DOCUMENTS

EP 3 015 659 A1 5/2016
GB 2 514 845 A 12/2014

* cited by examiner

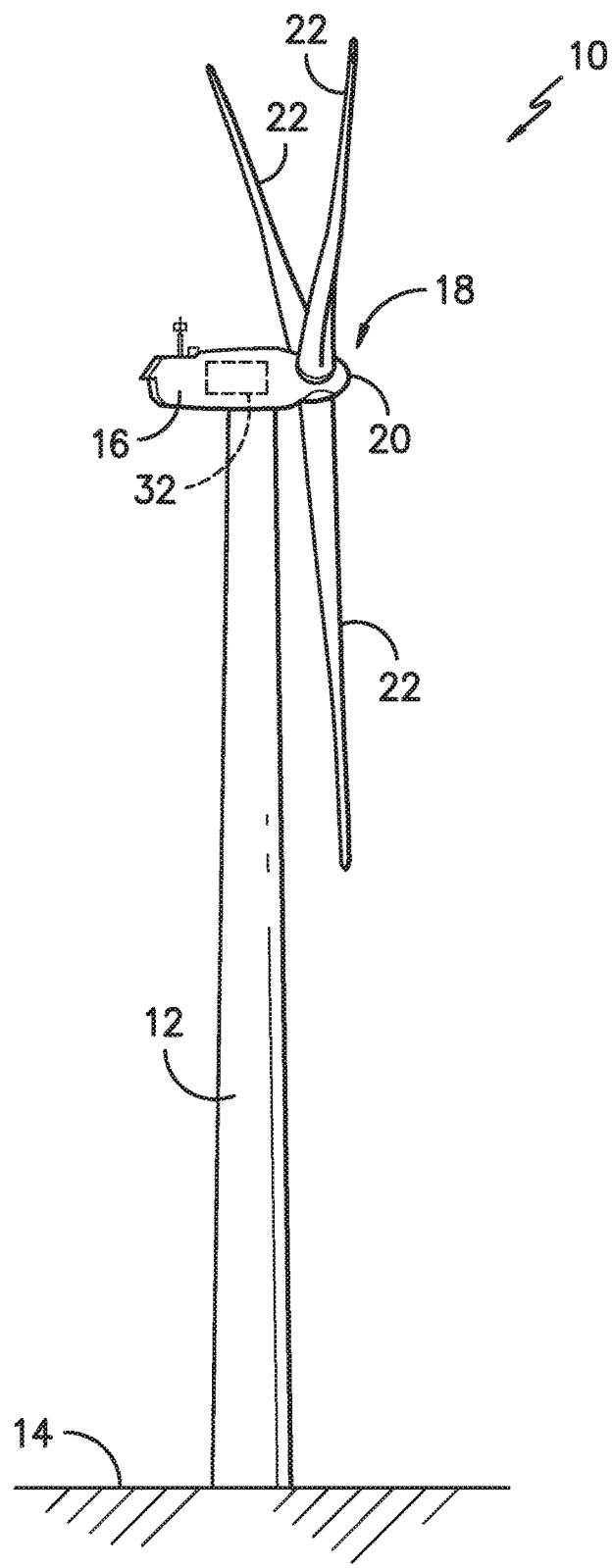
FIG. -1-

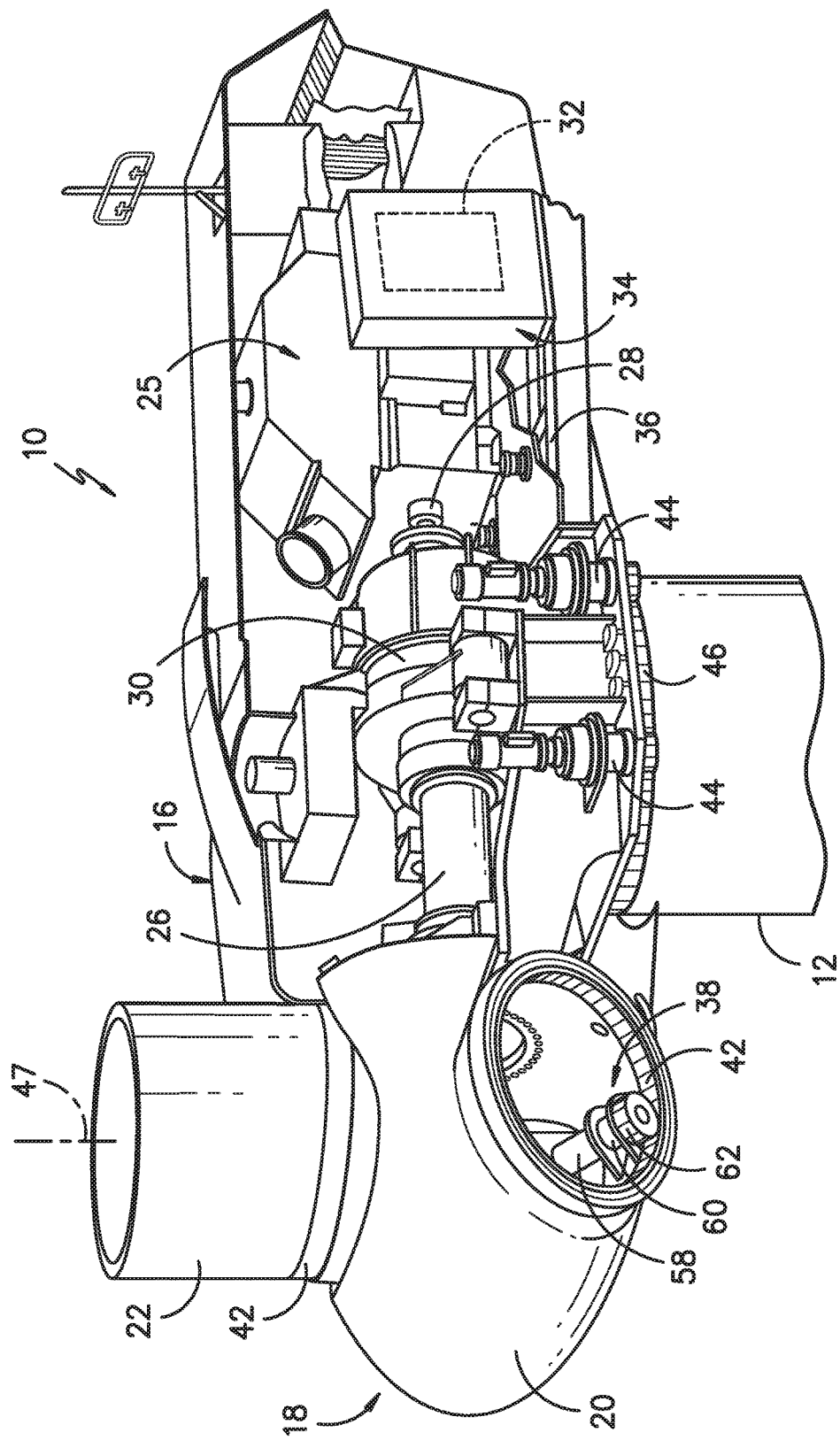
FIG. -2-

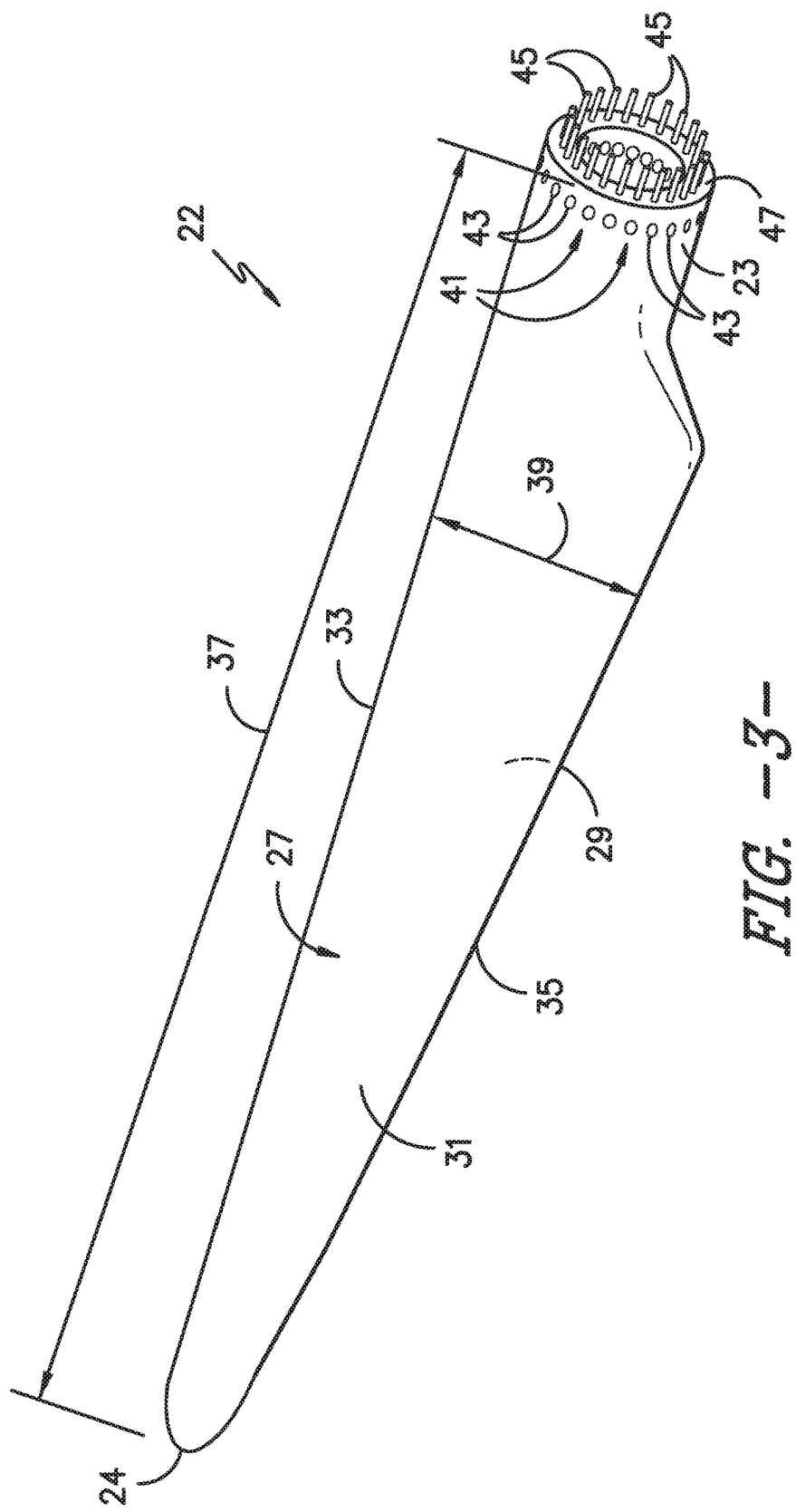
FIG. -3-

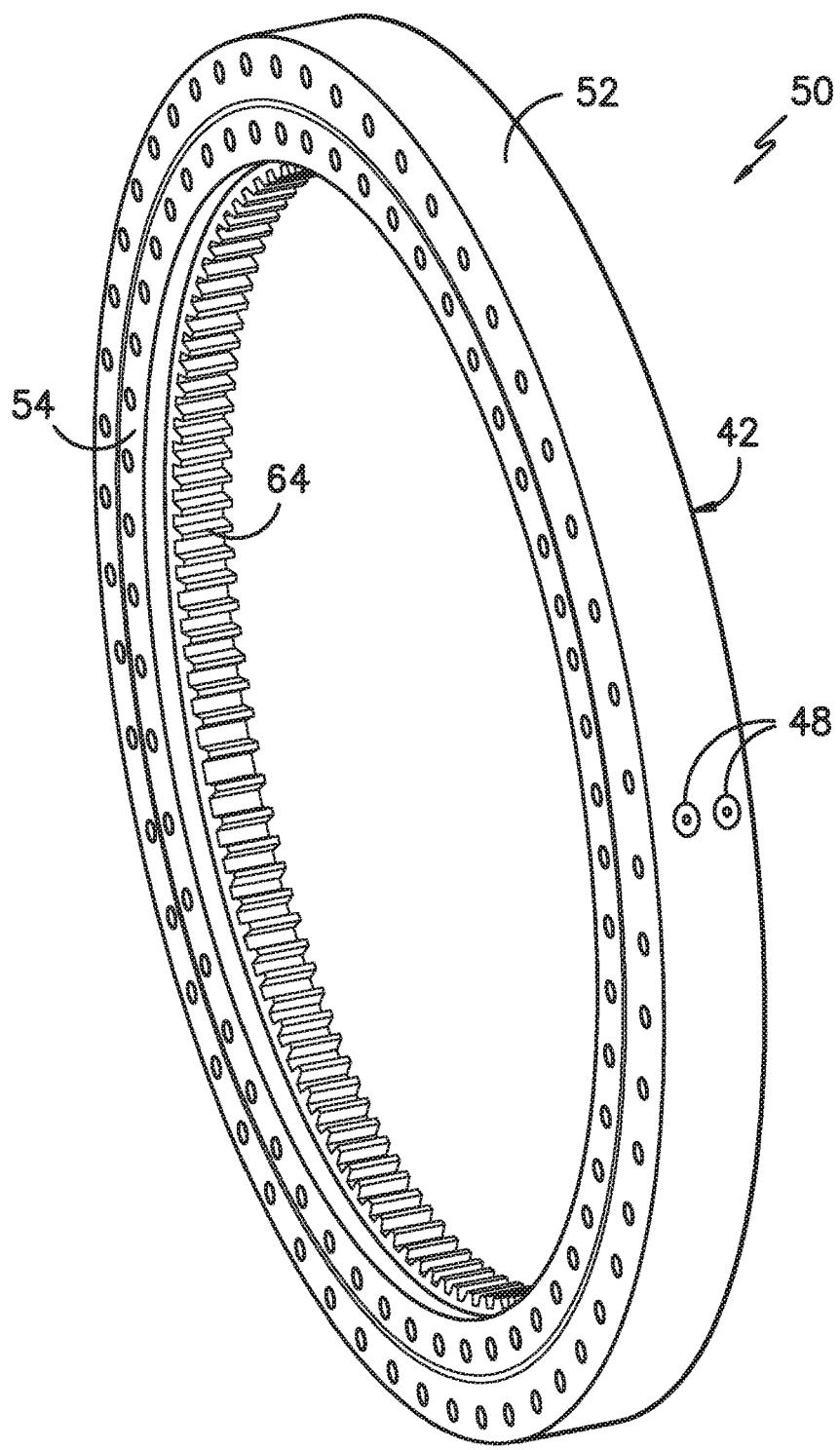
FIG. -4-

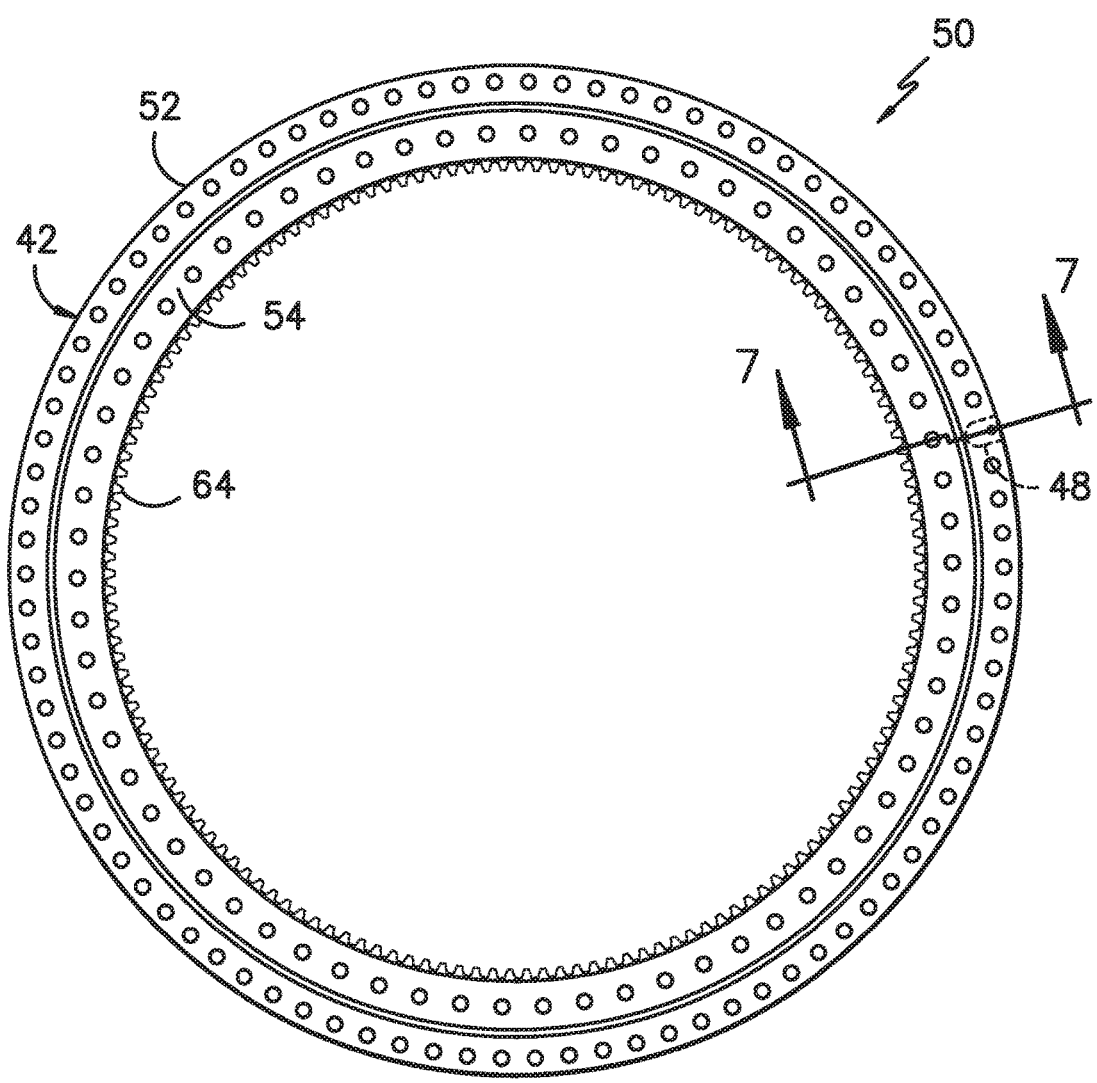
FIG. -5-

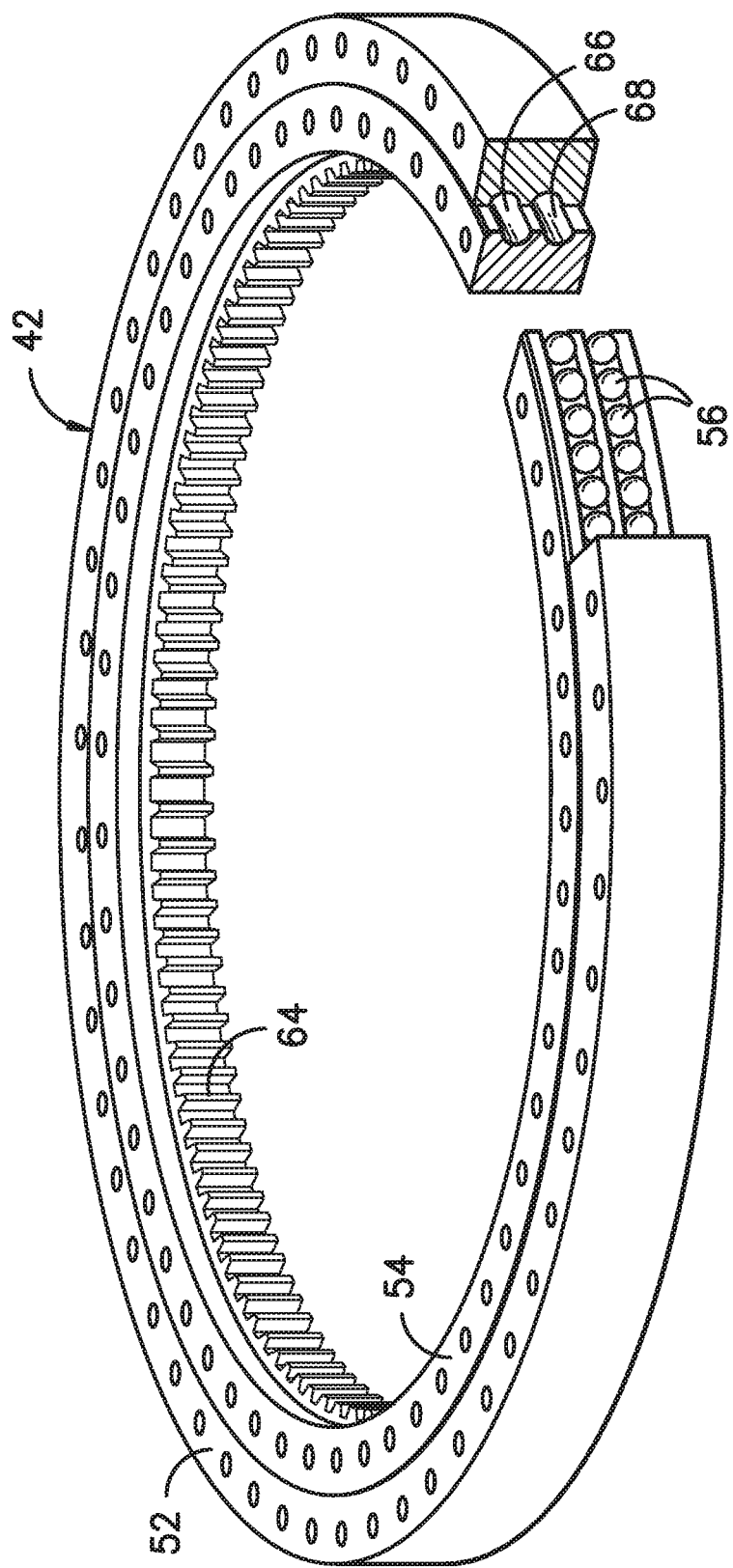
FIG. -6-

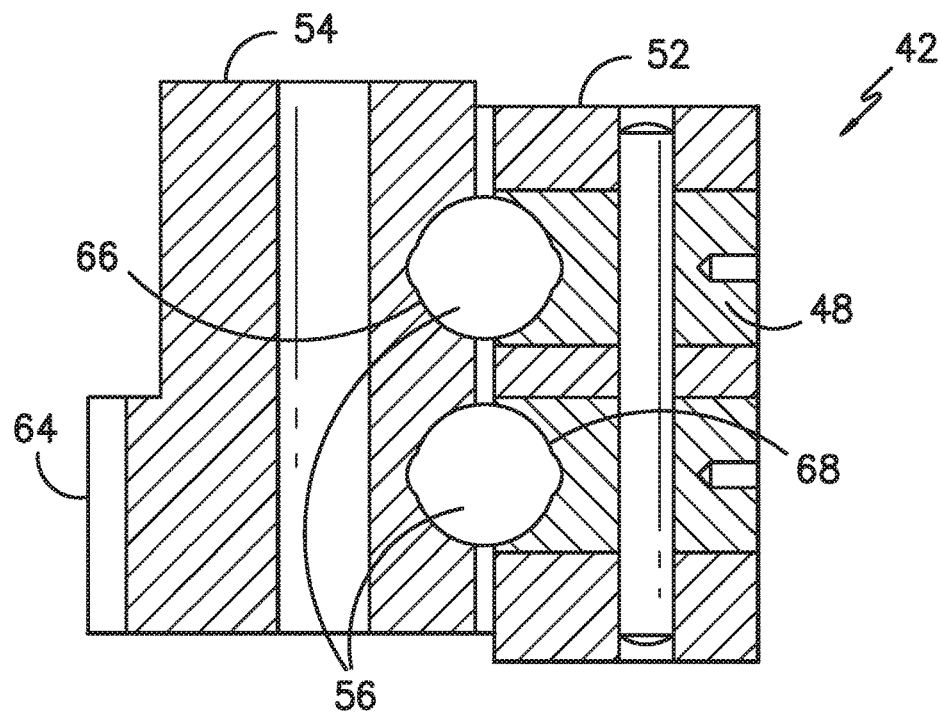
FIG. -7-
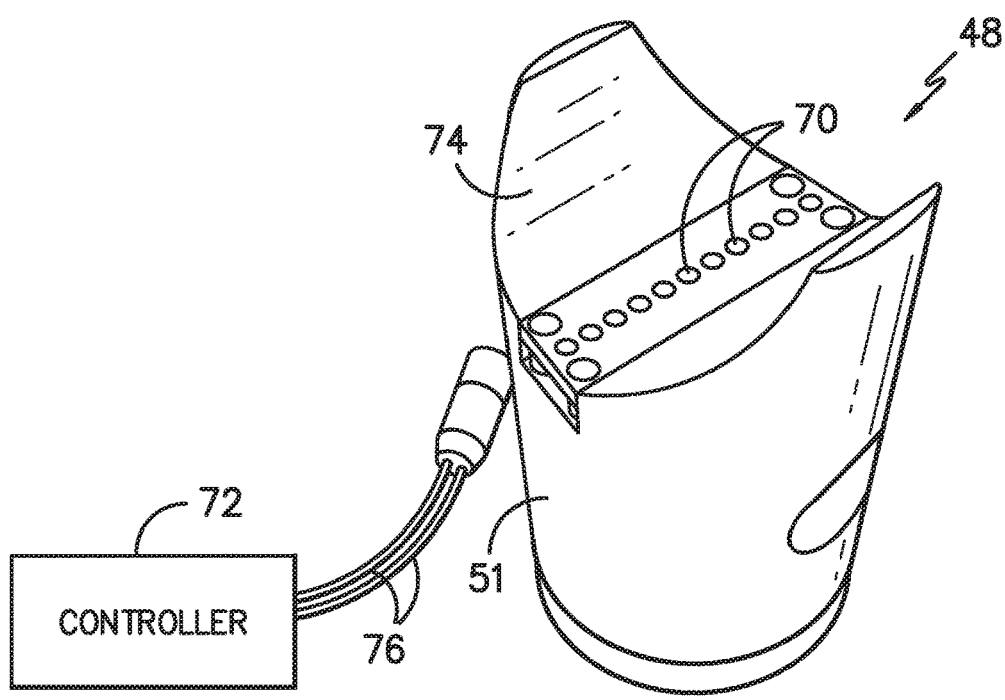
FIG. -8-

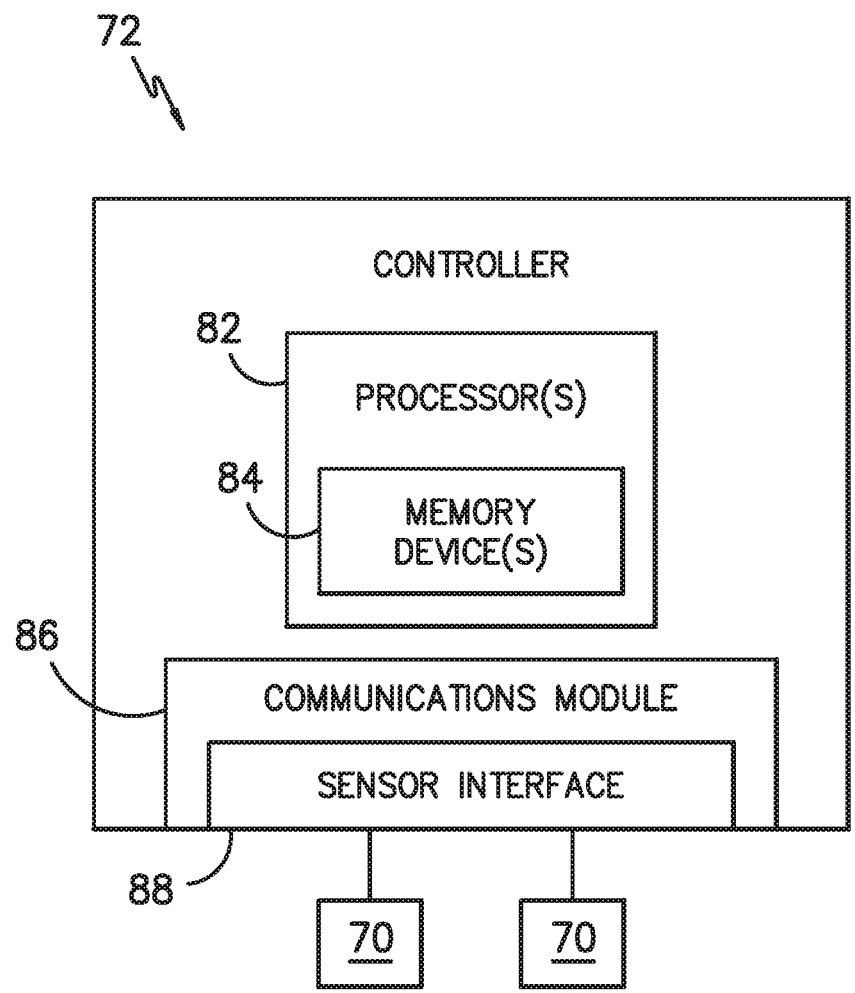
FIG. -9-

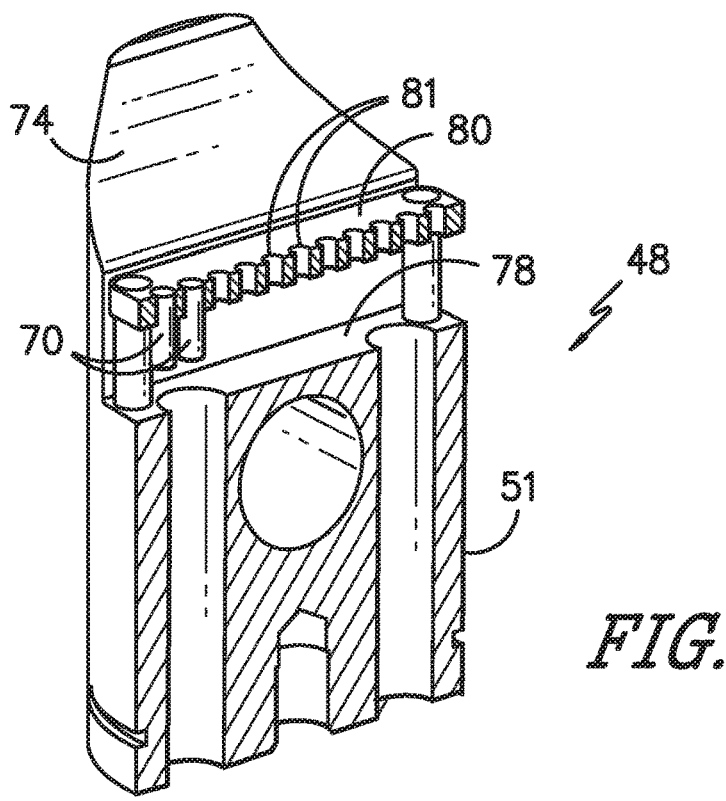
FIG. -10-
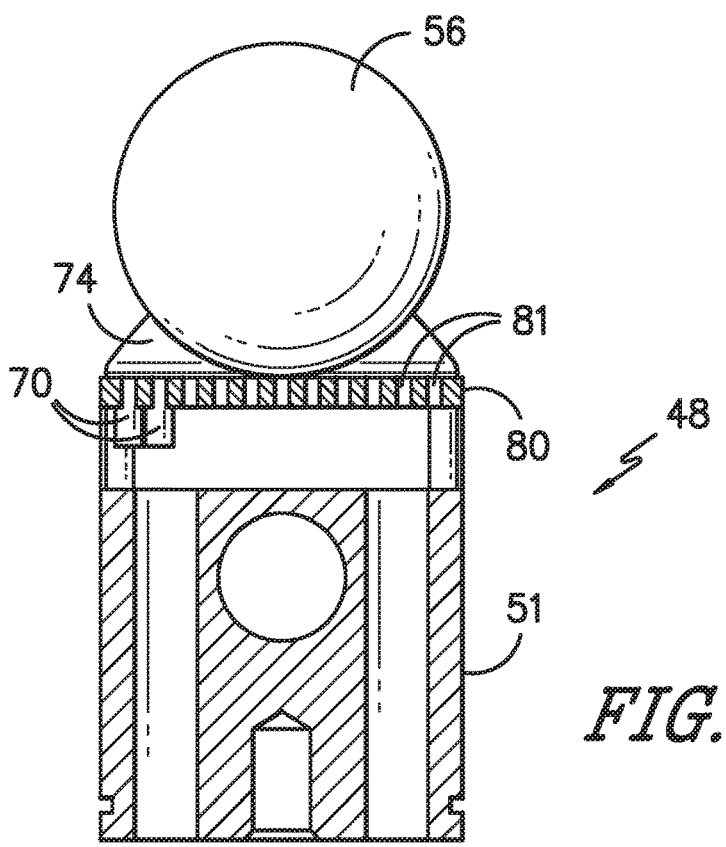
FIG. -11-

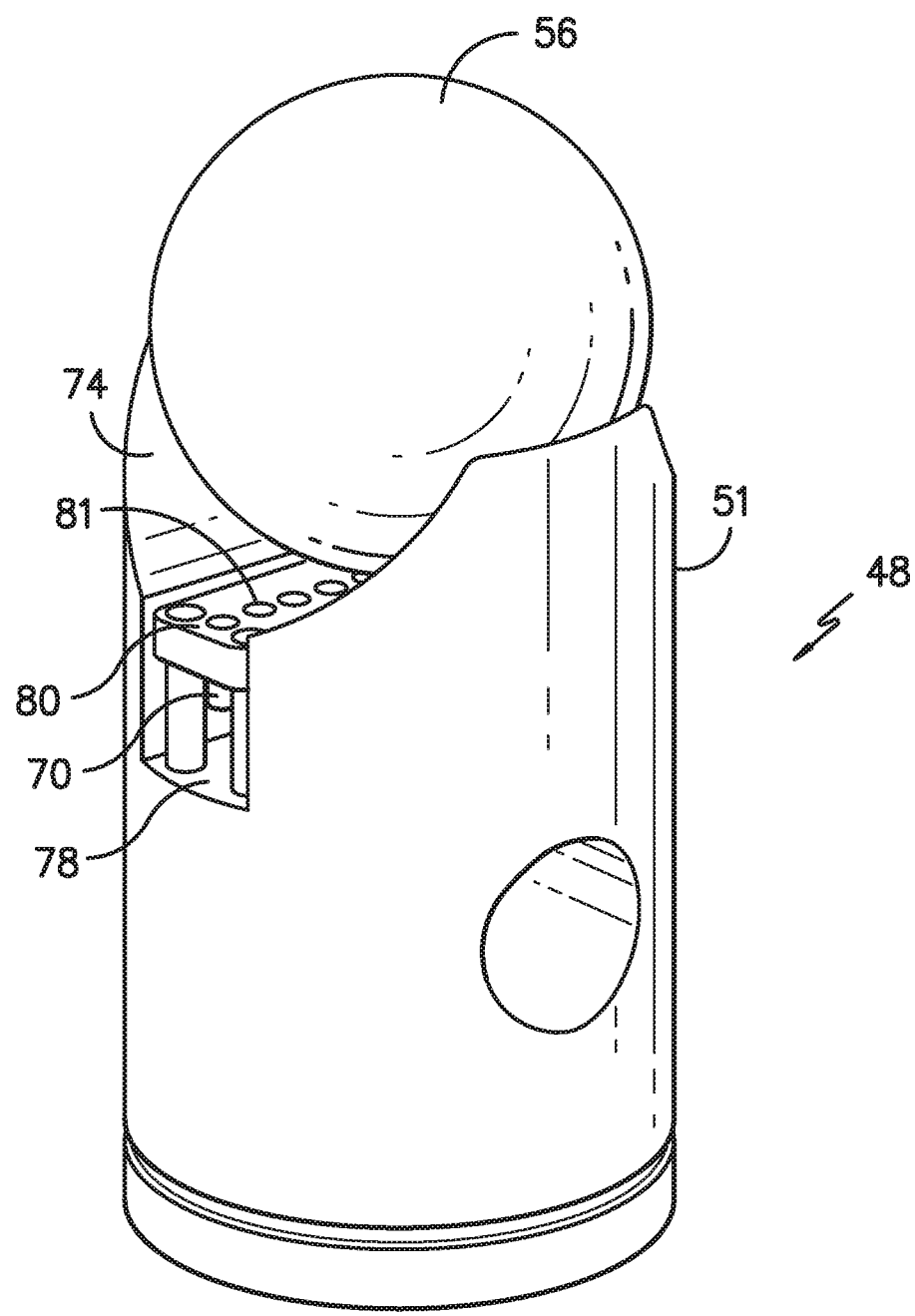
FIG. -12-

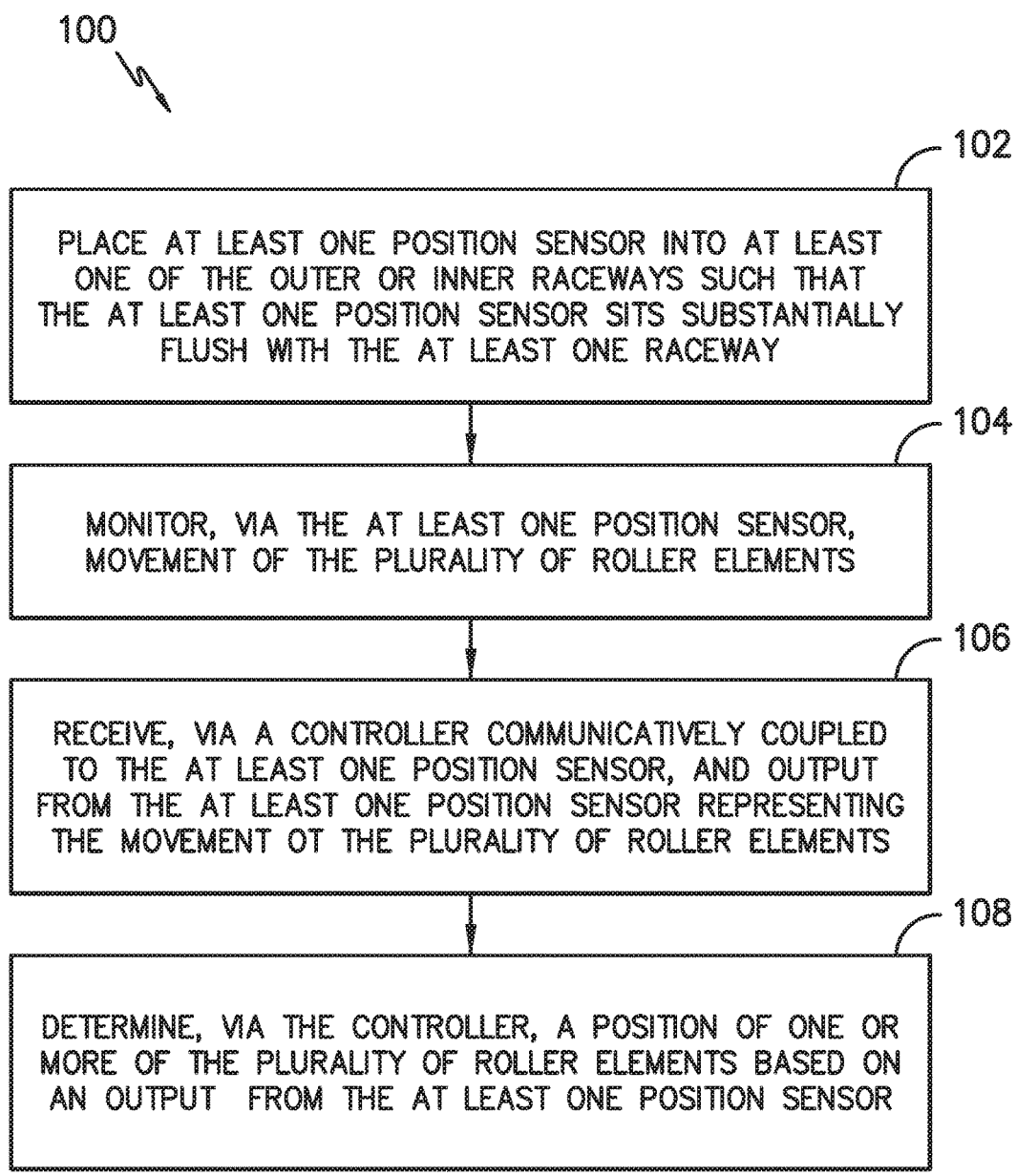
FIG. -13-

SYSTEM AND METHOD FOR MONITORING MOVEMENT OF A ROLLER ELEMENT OF A BEARING

FIELD

The present subject matter relates generally to wind turbines and, more particularly, to systems and methods for monitoring movement of roller elements, such as ball bearings, of wind turbine pitch bearings.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the nacelle and the rotor blades relative to the direction of the wind, wind turbines typically include one or more yaw and/or pitch bearings. The yaw and/or pitch bearings are typically slewing bearings which are rotational roller-element bearings that typically support a heavy but slow-turning or slow-oscillating load. As such, yaw bearings permit rotation of the nacelle and are mounted between the tower and the nacelle, whereas pitch bearings permit rotation of the rotor blades and are mounted between the rotatable hub and one of the rotor blades. Typical yaw and/or pitch bearings include an outer and inner race with a plurality of roller elements (e.g. ball bearings) configured between the races.

As wind turbines continue to increase in size, the slewing bearings must similarly increase in size due to increased loading. Further, in order for the slewing bearing to withstand such loading, it must include various components that can adequately react to the increased loads. Thus, for example, conventional bearings typically include spacers between each of the roller elements to maintain uniform loading throughout the bearing.

Wind turbine pitch bearings are subjected to a variety of combined loading and a variety of pitching profiles. This operational characteristic creates conditions for bearing fatigue and fretting damage, as well as ball compliment migration issues. As wind conditions in the field are random in nature, it is increasingly difficult to predict the exact movement of the rolling elements, which would give significant insight to various bearing damage modes. Further, such bearings are typically very expensive and can be difficult to access and replace. As such, failure of the bearings can result in a lengthy and expensive repair process.

If the ball movement within the bearing could be monitored, a better understanding of the causes of such movement that leads to fatigue load, fretting damage, migration issues, and/or other failure modes could also be predicted. Currently, there are no means for monitoring such movement since the balls are located within thick steel. Accordingly, systems and methods for monitoring movement of such ball bearings would be welcomed in the art as preventive maintenance could be employed before the bearing becomes damaged.

BRIEF DESCRIPTION

Aspects and advantages of the invention will be set forth in part in the following description, or may be obvious from the description, or may be learned through practice of the invention.

In one aspect, the present subject matter is directed to a bearing assembly for a wind turbine. The bearing assembly includes a bearing comprising an outer race, an inner race rotatable relative to the outer race, and a plurality of roller elements positioned within at least one raceway defined between the outer and inner races. Further, the bearing assembly includes at least one position sensor arranged with the at least one raceway. As such, the position sensor(s) is configured for monitoring movement of the plurality of roller elements. Moreover, the bearing assembly includes a controller communicatively coupled to the position sensor(s). Thus, the controller is configured to determine receive an output from the at least one position sensor and determine a position of one or more of the plurality of roller elements based on an output from the at least one position sensor.

In one embodiment, the position sensor(s) may be substantially flush with the raceway. Alternatively, the position sensor(s) may be embedded within the raceway or any other suitable location of the bearing. In another embodiment, the bearing assembly may include a plurality of position sensors positioned circumferentially around the bearing. In addition, the position sensors are arranged in one or more rows.

In further embodiments, the bearing includes at least one ball plug for placing the roller elements between the outer and inner races. As such, the ball plug includes a partial raceway that defines a portion of the at least one raceway. Thus, the position sensor(s) may be positioned on the partial raceway of the ball plug.

In additional embodiments, the controller is communicatively coupled to the position sensor(s) via one or more position sensor cables secured to the position sensor(s) and arranged at least partially within a body of the ball plug. In such embodiments, the one or more position sensor cables exit the ball plug away from the partial raceway (i.e. so as to not infer with rotation of the bearing).

In several embodiments, the bearing assembly further includes a plurality of position sensors positioned on the ball plug. In such embodiments, the ball plug may include a channel formed into the partial raceway and a sensor adaptor positioned within the channel. As such, the sensor adaptor is configured to receive and hold the plurality of position sensors therein. Further, the position sensors positioned on the ball plug may be arranged in one or more rows.

In further embodiments, the controller may be further configured to calculate a slippage of one or more of the roller elements based on the output. As such, the controller may also be configured to determine whether ball migration is occurring in the bearing based on the slippage.

In certain embodiments, the position sensor(s) described herein may include any one of or combination of the following sensors: proximity sensor, an inductive sensor, a Miniature Inertial Measurement Unit (MIMU), a pressure or load sensor, an accelerometer, a Sonic Detection and Ranging (SODAR) sensor, a Light Detection and Ranging (LIDAR) sensor, an optical sensor, or similar.

In particular embodiments, the roller elements may include: a ball, a sphere, a roller, a tapered roller, a barrel-shaped roller, or a cylindrical element. In additional embodiments, the bearing may include a pitch bearing or a yaw bearing.

In another aspect, the present disclosure is directed to a control system for a bearing of a wind turbine. The control system includes at least one position sensor arranged with at least one raceway of the bearing. As such, the position sensor(s) is configured for monitoring movement of a plurality of roller elements of the bearing. The control system also includes a controller communicatively coupled to position sensor(s). Thus, the controller is configured to receive an output from the position sensor(s) and determine a position of one or more of the plurality of roller elements based on an output from the at least one position sensor.

In yet another aspect, the present subject matter is directed to a method for detecting roller element movement within a bearing of a wind turbine. As mentioned, the bearing includes an outer race, an inner race rotatable relative to the outer race, and a plurality of roller elements positioned within at least one raceway defined between the outer and inner races. The method includes placing at least one position sensor into the at least one raceway such that the position sensor(s) sits substantially flush with the raceway. As such, the position sensor(s) is configured for monitoring movement of the plurality of roller elements. The method also includes receiving, via a controller communicatively coupled to the at least one position sensor, an output from the at least one position sensor. Further, the method includes determining, via the controller, a position of one or more of the plurality of roller elements based on an output from the at least one position sensor.

In one embodiment, the step of placing the position sensor(s) into the raceway may include placing the position sensor(s) onto a partial raceway of a ball plug of the bearing that defines a portion of the raceway. In such embodiment, the method may include placing a plurality of position sensors on the partial raceway of the ball plug.

In further embodiments, the step of placing the position sensor(s) into the raceway may include forming a channel into the partial raceway of the ball plug, placing a sensor adaptor within the channel, and installing the plurality of position sensors into the sensor adaptor.

In additional embodiments, the method may include monitoring relative movement of inner and outer raceways of the bearing. In such embodiments, the method may include calculating, via the controller, at least one of slippage, migration, or bunching of one or more of the roller elements based on at least one of the relative movement or the output from the at least one position sensor. It should be understood that the method may further include any one of combination of the steps, features, and/or embodiments as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective, internal view of one embodiment of a nacelle of the wind turbine shown in FIG. 1;

FIG. 3 illustrates a perspective view of one embodiment of one of the rotor blades of the wind turbine shown in FIG. 1;

FIG. 4 illustrates a perspective view of one embodiment of a pitch bearing of a wind turbine according to the present disclosure;

FIG. 5 illustrates a top view of one embodiment of a pitch bearing of a wind turbine according to the present disclosure;

FIG. 6 illustrates a partial, cut-away view of one embodiment of a pitch bearing of a wind turbine according to the present disclosure;

FIG. 7 illustrates a cross-sectional view of the pitch bearing of FIG. 5, particularly illustrating details of the ball plug;

FIG. 8 illustrates a perspective view one of embodiment of a ball plug of a pitch bearing according to the present disclosure; particularly illustrating a plurality of position sensors positioned in the raceway of the ball plug;

FIG. 9 illustrates a schematic diagram of one embodiment of a controller of a bearing assembly according to the present disclosure;

FIG. 10 illustrates a partial, perspective view one of embodiment of a ball plug of a pitch bearing according to the present disclosure; particularly illustrating a sensor adaptor arranged within a channel of the ball plug so as to accommodate the plurality of position sensors therein;

FIG. 11 illustrates a partial, side view one of embodiment of a ball plug of a pitch bearing according to the present disclosure; particularly illustrating a sensor adaptor arranged within a channel of the ball plug so as to accommodate the plurality of position sensors therein;

FIG. 12 illustrates a perspective view one of embodiment of a ball plug of a pitch bearing arranged with a ball bearing according to the present disclosure; particularly illustrating a sensor adaptor arranged within a channel of the ball plug so as to accommodate the plurality of position sensors therein; and FIG. 13 illustrates a flow diagram of one embodiment of a method for detecting roller element movement within a bearing of a wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a bearing assembly for a wind turbine that uses inductive sensing technology to detect ball movement within a ball bearing. Understanding ball movement allows for a more fundamental understanding of the unique application of a certain wind turbine bearings and how such movement can lead to failures (such as fatigue failures, fretting damage, as well as ball migration). As such, sensor(s) are placed along the bearing raceway path, likely in ball plug at a grease pocket. Depending on the sensor type, the sensors can be tuned to accurately detect position and/or proximity of the roller elements while ignoring other objects relating to the bearing, such as various lubricant. As the roller elements pass over the sensing face of the sensor, the sensor position is detected. Using multiple sensors communicatively coupled to a controller, accurate position and movement of the roller elements can be calculated. For example, in one embodiment, discrete proximity sensors as well as more advance inductive position sensors that use multiple inductive coils are used to accurately detect the position of the roller elements.

The bearing assembly of the present disclosure provides numerous advantages not present in the cited art. For example, one advantage of the sensing technology of the present disclosure is the sensor position range being large enough to detect a single ball passing as well as a new ball approaching the sensing field. As such, total ball migration can be calculated for all roller elements in the raceway. In addition, the sensing technology can be used for a better fundamental understanding of how the roller elements respond to specific pitch maneuvers under various loads, which aids in life estimation.

The present invention is described herein as it may relate to wind turbine bearings, including, at least, yaw bearings, pitch bearings, and/or similar. It should be appreciated, however, that the systems and methods in accordance with principles of the invention is not limited to use with a wind turbine, but is applicable to any suitable bearing application. For example, it should be understood that the systems and methods as described herein is configured to fit within conventional slewing bearings and/or modified slewing bearings known in the art and later developed and are not limited to a specific slewing bearing configuration.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Referring now to FIG. 2, a simplified, internal view of one embodiment of the nacelle 16 of the wind turbine 10 shown in FIG. 1 is illustrated. As shown, the generator 24 may be disposed within the nacelle 16 and supported atop a bedplate 36. In general, the generator 24 may be coupled to the rotor 18 for producing electrical power from the rotational energy generated by the rotor 18. For example, as shown in the illustrated embodiment, the rotor 18 may include a rotor shaft 26 coupled to the hub 20 for rotation therewith. The rotor shaft 26 may, in turn, be rotatably coupled to a generator shaft 28 of the generator 24 through a gearbox 30. As is generally understood, the rotor shaft 26 may provide a low speed, high torque input to the gearbox 30 in response to rotation of the rotor blades 22 and the hub 20. The gearbox 30 may then be configured to convert the low speed, high torque input to a high speed, low torque output to drive the generator shaft 28 and, thus, the generator 24.

The wind turbine 10 may also include a turbine controller 32 centralized within the nacelle 16. Further, as shown, the turbine controller 32 is housed within a control cabinet 34. Moreover, the turbine controller 32 may be communicatively coupled to any number of the components of the wind turbine 10 in order to control the operation of such components and/or implement various correction actions as described herein.

Referring back to FIG. 2, each rotor blade 22 may also include a pitch drive mechanism 38 configured to rotate each rotor blade 22 about its pitch axis 40 via a pitch bearing 42, thereby allowing the orientation of each blade 22 to be adjusted relative to the direction of the wind. Similarly, the wind turbine 10 may include one or more yaw drive mechanisms 44 communicatively coupled to the turbine controller 32, with each yaw drive mechanism(s) 44 being configured to change the angle of the nacelle 16 relative to the wind (e.g., by engaging a yaw bearing 46 of the wind turbine 10).

Referring now to FIG. 3, a perspective view of one of the rotor blades 22 shown in FIGS. 1 and 2 is illustrated in accordance with aspects of the present subject matter. As shown, the rotor blade 22 includes a blade root 23 configured for mounting the rotor blade 22 to the hub 20 and a blade tip 23 disposed opposite the blade root 23. A body 27 of the rotor blade 22 may extend lengthwise between the blade root 23 and the blade tip 24 and may generally serve as the outer shell of the rotor blade 22. As is generally understood, the body 27 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 27 may generally include a pressure side 29 and a suction side 31 extending between a leading edge 33 and a trailing edge 35. Additionally, the rotor blade 22 may have a span 37 defining the total length of the body 27 between the blade root 23 and the blade tip 24 and a chord 39 defining the total length of the body 27 between the leading edge 33 and the trailing edge 35. As is generally understood, the chord 39 may vary in length with respect to the span 37 as the body 27 extends from the blade root 23 to the blade tip 24.

Moreover, as shown, the rotor blade 22 may also include a plurality of T-bolts or root attachment assemblies 41 for coupling the blade root 23 to the hub 20 of the wind turbine 10. In general, each root attachment assembly 41 may include a barrel nut 43 mounted within a portion of the blade root 23 and a root bolt 45 coupled to and extending from the barrel nut 43 so as to project outwardly from a root end 47 of the blade root 23. By projecting outwardly from the root end 47, the root bolts 45 may generally be used to couple the blade root 23 to the hub 20 (e.g., via one of the pitch bearings 42), as will be described in greater detail below.

Referring now to FIGS. 4-7, various views of an embodiment of a bearing assembly 50 according to the present disclosure is illustrated. More specifically, as shown, the bearing assembly 50 includes a pitch bearing 42. It should be understood that the present disclosure is described with respect to a pitch bearing, but other bearing applications are within the spirit and scope of the invention, e.g. such as a yaw bearing. As shown, the pitch bearing 42 has outer race 52, inner bearing race 54, and a plurality of roller elements 56 disposed between the races 52, 54. As is generally understood, the outer race 52 may generally be configured to be mounted to a hub flange of the hub 20 using a plurality of hub bolts and/or other suitable fastening mechanisms. Similarly, the inner race 54 may be configured to be mounted to the blade root 23 using the root bolts 45 of the root attachment assemblies 41.

Further, the roller elements 56 as described herein may include any one of or combination of the following: one or more balls, spheres, rollers, tapered rollers, barrel-shaped rollers, cylindrical elements, or any other suitable roller elements. In addition, any suitable number of roller elements 56 may be employed. Further, the roller elements 56 may be arranged in any suitable configuration. For example, as shown in FIG. 7, two rows of roller elements 56 are employed, wherein each of the roller elements 56 is circumferentially spaced between the outer and inner races 52, 54. In still further embodiments, a single row or multiple, axially-spaced rows of roller elements 56 may be utilized in the bearing assembly 50 to provide additional strength. For example, in various embodiments, three or more rows of roller elements 56 may be employed.

Referring particularly to FIGS. 6 and 7, the roller elements 56 are configured to be received within separate raceways defined between the inner and outer races 52, 54. Specifically, a first raceway 66 is defined between the inner and outer races 52, 54 for receiving a first row of roller elements 56 and a second raceway 68 is defined between the inner and outer races 52, 54 for receiving the second row of roller elements 56. Thus, as shown in FIGS. 4, 5, and 7-11, the outer race 52 of the pitch bearing 42 may also include at least one ball plug 48 for allowing the roller elements 56 to be placed between the outer and inner races 52. 54 and into the raceways 66, 68. For example, as shown in FIGS. 4 and 7, the outer race 52 includes two ball plugs 48 (i.e. one for each row of roller elements 56). As such, the ball plug(s) 48 can be removed and the roller elements 56 can be inserted through the outer race 52 into one of the raceways 66, 68. In such embodiments, each raceway 66, 68 may be defined by separate walls of the outer and inner races 52, 54. For instance, as shown, the first raceway 66 is defined by a first outer raceway wall of the outer race 52 and a first inner raceway wall of the inner race 54. Similarly, the second raceway 68 is defined by a second outer raceway wall of the outer race 54 and a second inner raceway wall of the inner race 54.

As such, the inner race 54 may be configured to rotate relative to the outer race 52 (via the roller elements 56) to allow the pitch angle of each rotor blade 22 to be adjusted. As mentioned, relative rotation of the outer and inner races 52, 54 may be achieved using a pitch adjustment mechanism 38 mounted within a portion of the hub 20. In general, the pitch adjustment mechanism 38 may include any suitable components and may have any suitable configuration that allows the mechanism 38 to function as described herein. For example, as shown in FIG. 2, the pitch adjustment mechanism 38 may include a pitch drive motor 58 (e.g., an electric motor), a pitch drive gearbox 60, and a pitch drive pinion 62. In such an embodiment, the pitch drive motor 58 may be coupled to the pitch drive gearbox 60 so that the motor 58 imparts mechanical force to the gearbox 60. Similarly, the gearbox 60 may be coupled to the pitch drive pinion 62 for rotation therewith. The pinion 62 may, in turn, be in rotational engagement with the inner race 54. For example, as shown in FIG. 4, a plurality of gear teeth 64 may be formed along the inner circumference of the inner race 54, with the gear teeth 64 being configured to mesh with corresponding gear teeth formed on the pinion 62. Thus, due to meshing of the gear teeth 64 rotation of the pitch drive pinion 62 results in rotation of the inner race 54 relative to the outer race 52 and, thus, rotation of the rotor blade 22 relative to the hub 20.

Referring now to FIGS. 8-12, various views of position sensor assemblies configured with the bearing assembly 50 for monitoring movement of the roller elements 56 of the pitch bearing 42 are illustrated. More specifically, as shown, the pitch bearing 42 includes at least one position sensor 70 positioned substantially flush with one of the raceways 66, 68. For example, in one embodiment, the bearing assembly 50 may include a plurality of position sensors 70 positioned circumferentially around the pitch bearing 42 and being substantially flush with its respective raceway. In another embodiment, the position sensors 70 may be arranged in one or more rows. For example, as shown in FIGS. 8 and 10-12, the sensors 70 are arranged in a single row. In further embodiments, the sensors 70 may be arranged into a plurality of rows. In addition, the rows of sensors may be aligned or offset.

As shown in FIGS. 8 and 9, the sensor assembly includes a controller 72 communicatively coupled to the position sensor(s) 70. Thus, the controller 72 is configured to receive an output from the position sensor(s) 70 and determine a position of one or more of the roller elements 56 based on an output from the position sensor(s) 70. More specifically, as shown in FIG. 8, the controller 72 may be communicatively coupled to the position sensor(s) 70 via one or more sensor cables 76.

In addition, as shown in FIG. 9, the controller 72 may include one or more processor(s) 82 and associated memory device(s) 84 configured to perform a variety of computer-implemented functions (e.g., performing the methods, steps, calculations and the like and storing relevant data as disclosed herein). Additionally, the controller 72 may also include a communications module 86 to facilitate communications between the controller 72 and the position sensor(s) 70. Further, the communications module 86 may include a sensor interface 88 (e.g., one or more analog-to-digital converters) to permit signals transmitted from the position sensor(s) 70 to be converted into signals that can be understood and processed by the processors 82. It should be appreciated that the position sensor(s) 70 may be communicatively coupled to the communications module 86 using any suitable means. For example, as shown in FIG. 9, the position sensor(s) 70 may be coupled to the sensor interface 88 via a wired connection. However, in other embodiments, the position sensor(s) 70 may be coupled to the sensor interface 88 via a wireless connection, such as by using any suitable wireless communications protocol known in the art. As such, the processor(s) 82 may be configured to receive one or more signals from the position sensor(s) 70. Further, the controller 72 and the position sensor(s) 70 may also be an integrated packaged product, where one or more of the integrated packaged products may be utilized in the bearing assembly 50.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 82 may also be configured to compute advanced control algorithms and communicate to a variety of Ethernet or serial-based protocols (Modbus, OPC, CAN, etc.) as well as classical analog or digital signals. Additionally, the memory device(s) 84 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 84 may generally be configured to store suitable computer-readable instructions that, when implemented by the processor(s) 82, configure the controller 72 to perform the various functions as described herein.

In additional embodiments, the position sensor(s) 70 described herein may include any one of or combination of the following sensors: proximity sensor, an inductive sensor, a Miniature Inertial Measurement Unit (MIMU), a pressure or load sensor, an accelerometer, a Sonic Detection and Ranging (SODAR) sensor, a Light Detection and Ranging (LIDAR) sensor, an optical sensor, or similar.

The position sensor(s) 70 described herein may be secured to any suitable portion of the raceways 66, 68 so as to monitor movement of the roller elements. For example, in one embodiment, as shown in FIGS. 8 and 10-12, one or more sensors 70 may be placed on one of the ball plugs 48 of the pitch bearing 42. More specifically, as shown, the ball plug 48 includes a partial raceway that defines a portion of one of the raceways 66, 68 when inserted into the outer race 52. Thus, in certain embodiments, one or more of the position sensor(s) 70 may be positioned on the partial raceway 74 of the ball plug 48.

For example, as shown in FIGS. 8 and 10-12, a plurality of position sensors 70 are arranged with the ball plug 48. In such embodiments, the ball plug 48 of the pitch bearing 42 may be machined to accommodate the position sensors 70. More specifically, as shown in FIGS. 10-12, the ball plug 48 of the pitch bearing 42 may be machined to include a channel 78 formed into the partial raceway 74. Thus, as shown, the ball plug 48 may also include a sensor adaptor 80 positioned within the channel 78. For example, as shown, the sensor adaptor 80 may be sized to fit within the channel and may include a plurality of holes 81 configured to receive each of the sensors 70. As such, the sensor adaptor 80 is configured to receive and hold the position sensors 70 therein. Further, as shown, the position sensors 70 positioned on the ball plug 48 may be arranged in one or more rows. In addition, the sensor adaptor 80 may be secured within the channel 78 via one or more fasteners secured to the body 51 of the ball plug 48. In such embodiments, as shown in FIG. 8, the sensor cables 76 may be secured to the position sensor(s) 70 and arranged at least partially within the body 51 of the ball plug 48 such that the cables 76 exit the ball plug 48 away from the partial raceway 74 (i.e. so as to not infer with rotation of the pitch bearing 42).

Referring now to FIG. 13, a flow diagram of one embodiment of a method 100 for detecting roller element movement within the pitch bearing 42 of the wind turbine is illustrated. As shown at 102, the method 100 includes placing at least one position sensor 70 into a raceway 66, 68 of the bearing 42 such that the position sensor(s) 70 sits substantially flush with the raceway. As shown at 104, the method 100 includes monitoring movement of the roller elements 56 of the bearing 42. As shown at 106, the method 100 includes also includes receiving, via the controller 72 communicatively coupled to the position sensor(s) 70, an output from the position sensor(s) 70. As shown at 108, the method 100 includes determining, via the controller 72, a position of one or more of the roller elements 56 based on an output from the position sensor(s) 70.

More specifically, in certain embodiments, the method 100 may include monitoring relative movement of inner and outer raceways of the bearing 42. In such embodiments, the method 100 may include calculating, via the controller 72, at least one of slippage, migration, or bunching of one or more of the roller elements 56 based on at least one of the relative movement or the output from the sensor(s) 70.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a wind turbine, comprising;
    a bearing comprising an outer race, an inner race rotatable relative to the outer race, and a plurality of roller elements positioned within at least one raceway defined between the outer and inner races;
    at least one position sensor arranged substantially flush with the at least one raceway, the at least one position sensor configured for monitoring movement of the plurality of roller elements; and,
    a controller communicatively coupled to the at least one position sensor, the controller configured to receive an output from the at least one position sensor and determine a position of one or more of the plurality of roller elements based on an output from the at least one position sensor.

2. The bearing assembly of claim 1, further comprising a plurality of position sensors positioned circumferentially around the bearing.

3. The bearing assembly of claim 2, wherein the plurality of position sensors are arranged in one or more rows.

4. The bearing assembly of claim 1, wherein the bearing comprises at least one ball plug for placing the roller elements between the outer and inner races, the at least one ball plug comprises a partial raceway that defines a portion of the at least one raceway, the at least one position sensor positioned on the partial raceway of the ball plug.

5. The bearing assembly of claim 4, wherein the controller is communicatively coupled to the at least one position sensor via one or more position sensor cables secured to the at least position sensor and arranged at least partially within a body of the ball plug, the one or more position sensor cables exiting the ball plug away from the partial raceway.

6. The bearing assembly of claim 4, further comprising a plurality of position sensors positioned on the ball plug.

7. The bearing assembly of claim 6, wherein the ball plug further comprises a channel formed into the partial raceway and a sensor adaptor positioned within the channel, the sensor adaptor configured to receive and hold the plurality of position sensors therein.

8. The bearing assembly of claim 6, wherein the plurality of position sensors positioned on the ball plug are arranged in one or more rows.

9. The bearing assembly of claim 1, wherein the controller is further configured to calculate a slippage of one or more of the roller elements based on the output.

10. The bearing assembly of claim 9, wherein the controller is further configured to determine whether ball migration is occurring in the bearing based on the slippage.

11. The bearing assembly of claim 1, wherein the at least one position sensor comprises at least one of a proximity sensor, an inductive sensor, a Miniature Inertial Measurement Unit (MIMU), a pressure or load sensor, an accelerometer, a Sonic Detection and Ranging (SODAR) sensor, a Light Detection and Ranging (LIDAR) sensor, or an optical sensor.

12. The bearing assembly of claim 1, wherein the plurality of roller elements comprise at least one of the following: a ball, a sphere, a roller, a tapered roller, a barrel-shaped roller, or a cylindrical element.

13. The bearing assembly of claim 1, wherein the bearing comprises at least one of a pitch bearing or a yaw bearing.

14. A control system for a bearing of a wind turbine, the control system comprising;
    at least one position sensor arranged substantially flush with at least one raceway of the bearing, the at least one position sensor configured for monitoring movement of a plurality of roller elements of the bearing; and,
    a controller communicatively coupled to the at least one position sensor, the controller configured to receive an output from the at least one position sensor and determine a position of one or more of the plurality of roller elements based on an output from the at least one position sensor.

15. A method for detecting roller element movement within a bearing comprising an outer race, an inner race rotatable relative to the outer race, and a plurality of roller elements positioned within at least one raceway defined between the outer and inner races, the method comprising:
    placing at least one position sensor substantially flush with at least one of the outer or inner raceways;
    monitoring, via the at least one position sensor, movement of the plurality of roller elements;
    receiving, via a controller communicatively coupled to the at least one position sensor, an output from the at least one position sensor representing the movement of the plurality of roller elements; and,
    determining, via the controller, a position of one or more of the plurality of roller elements based on an output from the at least one position sensor.

16. The method of claim 15, wherein placing at least one position sensor into the at least one raceway further comprises:
    placing the at least one position sensor onto a partial raceway of a ball plug of the bearing that defines a portion of the at least one raceway.

17. The method of claim 16, wherein placing at least one position sensor into the at least one raceway further comprises:
    forming a channel into the partial raceway of the ball plug;
    placing a sensor adaptor within the channel; and,
    installing the at least one position sensor into the sensor adaptor.

18. The method of claim 15, further comprising monitoring relative movement of inner and outer raceways of the bearing.

19. The method of claim 18, further comprising calculating, via the controller, at least one of slippage, migration, or bunching of one or more of the roller elements based on at least one of the relative movement or the output from the at least one position sensor.

* * * * *